United States Patent
Van Nuland et al.

(10) Patent No.: US 7,837,950 B2
(45) Date of Patent: Nov. 23, 2010

(54) APPARATUS FOR THE PRODUCTION OF POLYETHYLENE AND ETHYLENE COPOLYMERS

(75) Inventors: Tom Van Nuland, Baton Rouge, LA (US); Roger Claessens, Berlaar (BE); Henri Aime Lammens, Antwerp (BE); Geert Vaes, Heist-op-den-Berg (BE)

(73) Assignee: ExxonMobil Chemical Patents Inc., Houston, TX (US)

( * ) Notice: Subject to any disclaimer, the term of this patent is extended or adjusted under 35 U.S.C. 154(b) by 0 days.

(21) Appl. No.: 12/299,740

(22) PCT Filed: Apr. 4, 2007

(86) PCT No.: PCT/EP2007/003040

§ 371 (c)(1),
(2), (4) Date: May 5, 2009

(87) PCT Pub. No.: WO2007/134670

PCT Pub. Date: Nov. 29, 2007

(65) Prior Publication Data

US 2010/0022736 A1     Jan. 28, 2010

(30) Foreign Application Priority Data

May 19, 2006   (GB) .................... 0609973.3

(51) Int. Cl.
*C08F 2/00*   (2006.01)
*C08F 110/02*   (2006.01)
*B01J 19/00*   (2006.01)

(52) U.S. Cl. ............... 422/131; 526/68; 526/71; 526/352

(58) Field of Classification Search ............... 526/68, 526/72, 348, 352, 71
See application file for complete search history.

(56) References Cited

U.S. PATENT DOCUMENTS

| | | | | |
|---|---|---|---|---|
| 2,379,751 A | * | 7/1945 | Russell | 585/709 |
| 4,082,910 A | | 4/1978 | Buechner et al. | |
| 4,215,207 A | * | 7/1980 | Durand et al. | 526/64 |
| 4,342,853 A | * | 8/1982 | Durand et al. | 526/68 |
| 4,558,105 A | * | 12/1985 | Carrick et al. | 526/68 |

FOREIGN PATENT DOCUMENTS

| | | |
|---|---|---|
| EP | 0527688 | 2/1993 |
| GB | 1338280 | 11/1973 |

* cited by examiner

*Primary Examiner*—David Wu
*Assistant Examiner*—Elizabeth Eng

(57) ABSTRACT

The invention provides an apparatus and a process for the high pressure polymerization of ethylene, optionally with one or more comonomers, in which unreacted monomer is separated from the polymer in a separation system having at least first, second and third separation vessels and in which off gas from the second vessel is recombined back into the product mixture upstream of the first separation vessel, preferably using a jet pump.

19 Claims, 3 Drawing Sheets

APPARATUS FOR THE PRODUCTION OF POLYETHYLENE AND ETHYLENE COPOLYMERS

CROSS-REFERENCE TO RELATED APPLICATIONS

This application is a National Stage Application of International Application No. PCT/EP2007/003040 filed Apr. 4, 2007, which claims priority to Great Britain Patent Application No. 0609973.3, filed May 19, 2006, both of which are incorporated herein by reference.

FIELD OF THE INVENTION

The invention relates to an apparatus and a process for polymerizing ethylene under high pressure, optionally in the presence of comonomers. In particular, the invention relates to an apparatus and process for the separation of polymer from unreacted monomer.

BACKGROUND OF THE INVENTION

High pressure reactors, such as tubular reactors and autoclaves, are used for the polymerization of ethylene at high pressure, for example, pressures of over 1000 bar, and up to 3000 bar or higher. In such processes, fresh ethylene from an ethylene supply is compressed to reactor pressure, typically by a combination of a primary compressor which compresses the ethylene to an intermediate pressure, say, around 300 bar, and a secondary compressor which compresses the ethylene from that intermediate pressure up to the final reactor pressure. The ethylene is then combined, in the reactor, with initiators and any comonomers and is polymerised to give a mixture comprising principally polymer and unreacted monomer. That mixture leaves the reactor through a valve, generally referred to as a high pressure let down valve, and then enters a separation system in which unreacted monomer is separated from the polymer and recycled back to the suction of the secondary compressor where it is combined with the fresh ethylene from the primary compressor.

Various forms of separation system are known. One such known separation system includes two separation vessels arranged in series. The first separation vessel, sometimes referred to as the high pressure vessel, has an inlet for the product mixture coming from the high pressure let down valve, an outlet for the separated unreacted monomer gas (referred to as "off gas") and an outlet in the bottom of the vessel for the polymer. That polymer, which still contains, say, 30 to 40 wt % of ethylene, passes from the outlet of the first vessel through a conduit into the second vessel, often referred to as the low pressure vessel, where almost all of the remaining ethylene separates off and is removed through an upper outlet as off gas leaving the molten polymer to flow through an outlet in the bottom of the vessel. Typically, the high pressure vessel will operate at a pressure such that the off gas can be returned, via a recycle system, to the suction of the secondary compressor. The low pressure separator operates at a much lower pressure, and the off gas from the low pressure separator must be compressed in a further compressor (known as a "purge compressor") before being sent to the secondary compressor.

The molten polymer leaving the separation system is generally extruded and cooled to give a solid product, typically in pellet form, which is sent for storage or to other product handling facilities. The polymer product typically retains a small amount of residual ethylene, which slowly leaks out of the pellets. The product storage facilities must therefore be well ventilated to prevent a build up of ethylene. However, the venting of organic compounds such as ethylene to the atmosphere is now recognised as being undesirable, and is subject to regulatory control in many parts of the world.

The polymerization of ethylene is an exothermic process which generates heat. Usually, some of that heat energy is recovered from the recycled ethylene and used to generate steam. In spite of that saving, the electrical energy required for the compression of the ethylene to reactor pressure represents a significant proportion of the cost of the final product and therefore it is desirable for both economic and environmental reasons to maximise the amount of polymer produced per unit energy consumed by the compressors.

High pressure polymerization reactors generally have lifetimes of 20 or 30 years, or even longer. For many years now, great efforts have been made to increase the productivity of existing facilities by "debottlenecking". However, there remains a need to increase the capacity of existing high pressure polymerization plants.

U.S. Pat. No. 4,342,853 describes an intermediate pressure separator. However this document does not teach that the off gas from at least one separation vessel downstream of the first separation vessel is returned to a location downstream of the high pressure let down valve and upstream of the first separation vessel.

U.S. Pat. No. 4,082,910 uses the residence time in the separators to control product properties; however there is no teaching to use an intermediate pressure separator.

U.S. Pat. No. 4,215,207 describes the use of a jet pump to pull in gas from the recycle outlet into the outlet stream of the reactor without use of a separator operating at a pressure intermediate a higher and lower pressure separator.

It would be desirable to have apparatus and processes which at least partially met one or more of the above-mentioned needs.

SUMMARY OF THE INVENTION

The present invention provides an apparatus for the high pressure polymerization of ethylene, and optionally one or more comonomers, comprising a high pressure reactor in which monomer is polymerised to produce a product mixture comprising polymer and unreacted monomer, a high pressure let down valve downstream of the reactor through which the product mixture from the high pressure reactor flows; and a separation system downstream of the high pressure let down valve, the separation system comprising at least first, second and third separation vessels arranged in series for the separation of gas from the product mixture as off gas and pump means for returning at least some of the off gas from at least one of the separation vessels downstream of the first separation vessel back into the product mixture at a location downstream of the high pressure let down valve and upstream of the first separation vessel.

Generally speaking, the use of three or more separation vessels allows, when compared to separation systems having only one or two separation vessels, an improved separation which generally results in lower levels of residual monomer in the polymer leaving the separation system, and therefore makes possible a reduction in the amount of monomer per kilogram of polymer which is lost after solidification and pelletization of the polymer, such as leaks from the polymer during storage, and is wasted, for example by loss to the atmosphere. That allows a reduction in the overall monomer lost to the atmosphere or, alternatively, the amount of polymer produced by the polymerization plant can be increased without contravening any permitted levels of monomer emission.

The return of at least some of the off gas from the second, third or subsequent separation vessel to the stream of product mixture upstream of the first separation vessel also means that that returned off gas re-enters the first separation vessel. A portion of that returned off gas will then be separated from the product mixture in the first separation vessel and will exit as off gas from that vessel while the remainder will pass through to the second separation vessel. Again, a portion of that remainder will be removed as off gas from the second separation vessel and will return once more to the first separation vessel. The effect of this circuit is to increase the proportion of unreacted monomer which is produced as off gas from the first separation vessel and decrease the proportion of unreacted monomer which is produced as off gas from subsequent separation vessels. The separation system of the invention thereby makes possible on an existing plant an increase in the total amount of unreacted monomer separated (with a corresponding increase in the amount of polymer produced in the plant) whilst avoiding the need to provide additional compression capacity for the compression of the off gas from the separation vessels downstream of the first separation vessel. In that way, an existing plant having a two stage separation system in which the off gas from the first stage is returned via a recycle system to the secondary compressor for recompression to the reactor pressure and in which the off gas from the second stage (which is at a lower pressure that the first stage off gas) must be compressed in a purge compressor (or in part of the primary compressor) prior to entering the secondary compressor, can be modified according to the invention to make possible an increase in the throughput through the separation system without needing an additional purge compressor.

The off gas from the second or subsequent separation vessel will naturally be at a lower pressure than the product mixture downstream of the high pressure let down valve and upstream of the first separation vessel, and therefore the off gas which is returned to that product mixture must be compressed by the pump means to a pressure equal to or greater than that of the product mixture. The pump means can be any suitable pump or compressor. However, in an especially favoured embodiment, the pump means is one which utilises the energy of the flow of the product mixture to compress the returned off gas. In that way, the overall energy consumption per unit polymer produced is reduced, in comparison with an arrangement in which, say, a compressor driven entirely by an external electrical supply is used. More significantly, the use of a pump or compressor which is powered at least in part by the flow of the product mixture in the apparatus of the invention will in general reduce the power consumption when compared to a conventional two stage separation system handling the same throughput, because in that conventional system the volume of off gas requiring compression in a purge compressor would be greater. Put another way, the separation system of the invention which returns off gas from the second or subsequent system vessel back to the flow into the first separation vessel ensures that more of the off gas produced by the system as a whole is kept at a higher pressure, and thereby reduces the need to recompress gas, as compared to the known two stage system.

Preferably, the pump means is a jet pump. Jet pumps are capable of pumping both gases and liquids and are known for use in a wide variety of applications including the pumping of water from deep boreholes and in oilfield applications.

Jet pumps are based on the same principles as ejectors. According to the Bernoulli principle, as the speed of a moving fluid increases, the pressure within the fluid decreases. A high velocity jet emerging from a nozzle into a diffuser will create a suction which will entrain gas from a secondary stream. Typically, in the application of a jet pump in the apparatus of the invention the high pressure product stream from the high pressure let down valve expands and flows through a nozzle to produce a high velocity jet which generates a region of low pressure. The jet pump includes an inlet into that region of low pressure through which the off gas returned from the second or subsequent separator is drawn. Downstream of the nozzle, the product mixture and the off gas mix together.

Jet pumps have no moving parts and are therefore robust and have low maintenance requirements. Those benefits are, of course, highly significant in the operation of a high pressure ethylene polymerization plant. SembCorp Simon Carves Ltd of Cheadle Hume in the UK is one company which has been involved in the design and installation of jet pumps handling high pressure fluids.

The term "monomer" as used herein refers to ethylene and to any mixture of ethylene with one or more comonomers. Comonomers suitable for copolymerization with ethylene under high pressure include vinyl ethers such as vinyl methyl ether and vinyl phenyl ether, olefins such as propylene, 1-butene, 1-octene and styrene, vinyl esters such as vinyl acetate, vinyl butyrate and vinyl pivalate, haloolefins such as vinyl fluoride and vinylidene fluoride, acrylic esters such as methyl acrylate, ethyl acrylate and methacrylates, other acrylic or methacrylic compounds such as acrylic acid, methacrylic acid, maleic acid, acrylonitrile and the acrylamides, and other compounds such as allyl alcohol, vinyl silanes, and other copolymerisable vinyl compounds.

The product stream leaving the reactor will include, in addition to polymer and unreacted monomer, other substances such as initiator residues and optionally one or more chain transfer agents.

Many suitable initiators are known to the skilled person. Organic peroxides are a preferred class of initiators. Typically, a mixture of several initiators having different decomposition temperature will be used in order to provide ongoing generation of free radicals as the temperature of the reaction mixture rises.

The skilled person will also be aware of many suitable chain transfer agents (also referred to as "modifiers"). Examples include propylene, 1-butene, carbon tetrachloride, and proprionaldehyde. Chain transfer agents are described in Adv. Polym. Sci, Vol. 7, 386-448 (1970).

The high pressure reactor may be any reactor suitable for the high pressure polymerization of ethylene and, optionally, ethylene/comonomer mixtures. Autoclaves and tubular reactors are well known examples of such reactors.

Similarly, the high pressure let down valve can be any valve arrangement which is suitable for letting down the pressure of the product stream coming from the reactor to a pressure suitable for the separation system.

The terms "upstream" and "downstream" as used herein are used with reference to the direction of the flow of monomer and polymer through the apparatus beginning with the ethylene source and going through to the finished polymer storage facilities, unless another meaning is clear from the context.

The separation vessels may be of any suitable form. Each separation vessel preferably has an upper cylindrical portion, into which the inlet for the product mixture from upstream empties and from which an outlet for off gas leads, and a lower portion of inverted conical form in which the concentrated polymer phase is collected and which has at its lowest extremity an outlet through which the concentrated polymer phase leaves the separation vessel. One or more of the vessels may have tangential inlets. Tangential inlets can give improved separation by causing the product mixture to swirl around a central axis in the manner of a cyclone. As the skilled person is aware, the separation vessels should be designed so that the velocity of the gas rising within the vessel toward the off gas outlet is significantly less than the velocity required to suspend and entrain particles of the concentrated polymer phase. The design of the separation vessels should also be such as to minimise the residence time of the polymer in the system. Preferably, each separation chamber has an internal coating to allow easy cleaning. Advantageously, the length:diameter ration is in the range of from 6:1 to 3:1, and is preferably around 4:1 (tangent to tangent). The angle of the conical section is advantageously in the range of from 50 to 70 degrees, and is so preferably around 60 degrees.

Whilst increasing the number of separation vessels will tend to improve the separation and reduce the level of residual monomer in the final polymer (in the same way that increasing the number of plates in a distillation column) an increase in the number of separation vessels also tends to increase the residence time of the polymer in the separation system and the cost and complexity of that system.

In a preferred embodiment, the apparatus of the invention comprises three separation vessels. Preferably, the first separation vessel operates at a pressure such that the off gas from that separation vessel may be returned without compression, via a recycle system, to the suction of the compressor immediately upstream of the reaction vessel (so in the usual layout in which there is a primary compressor and a secondary compressor, the off gas from the first separation vessel will preferably feed into the suction of the secondary compressor).

The conduit from the high pressure let down valve to the first separation vessel may include other components, for example, a product cooler. Where a product cooler is present, preferably the off gas is returned to the product mixture at a location downstream of the product cooler.

The first separation vessel may, for example, operate at a pressure of at least 200 bar, preferably at least 220 bar, more preferably at least 250 bar and especially preferably at least 270 bar. The first separation vessel optionally operates at a pressure of no more than 500 bar, preferably no more than 400 bar, more preferably no more than 350 bar and especially preferably no more than 330 bar. The first separation vessel optionally operates at a pressure in the range of from 200 bar to 500 bar, preferably from 220 bar to 400 bar, more preferably from 250 to 350 bar and especially preferably from 270 to 330 bar. In one embodiment, the pressure in the first separation vessel is governed by the discharge pressure of the primary compressor which may be controlled, for example, by a spillback valve for returning gas from the discharge of the primary compressor back to the intake of the primary compressor.

The product mixture leaving the reactor preferably comprises from 25 to 45 wt %, more preferably from 30 to 40 wt % of polymer. The product mixture entering the first separation vessel preferably comprises from 10 to 40 wt %, more preferably from 25 to 35 wt % of polymer. The product mixture leaving the first separation vessel may comprise, for example, in the range of from 40 to 90 wt %, more preferably from 50 to 80 wt % and especially preferably from 60 to 70 wt % polymer. The actual concentrations and other conditions such as temperature at any one time will of course depend somewhat according to the polymer grade being produced at that time.

Advantageously, the outlet through which the product mixture leaves the first separation vessel is provided with a control valve. Especially advantageously, the first separation vessel is provided with a sensor, for example, a radioactive sensor for monitoring the level of product mixture.

The second separation vessel operates at a pressure which is lower that that of the first separation vessel and is preferably no more than 250 bar, advantageously no more than 200 bar, more preferably no more than 150 bar and especially preferably no more than 120 bar. The second separation vessel optionally operates at a pressure of at least 10 bar, advantageously at least 30 bar, more preferably at least 50 bar and especially preferably at least 70 bar. The second separation vessel optionally operates at a pressure in the range of from 10 to 250 bar, advantageously from 30 to 200 bar, more preferably from 50 to 150 bar and especially preferably from 70 to 120 bar. The pressure in the second separation vessel may be controlled, for example, by a control valve in the conduit from that vessel to the suction of the pump means.

Advantageously, the product mixture leaving the second separation vessel comprises in the range of from 70 to 98 wt %, preferably from 80 to 97 wt % and especially preferably from 88 to 97 wt % of polymer. Preferably, the outlet through which the product mixture leaves the second separation vessel is also provided with a control valve. Advantageously, the second separation vessel is also provided with a sensor, the example, a radioactive sensor, for sensing the level of product mixture in the vessel.

Preferably, at least 50%, more preferably at least 80% and advantageously at least 90% of the off gas from the second separation vessel is returned to the product mixture downstream of the high pressure let down valve and upstream of the first separation vessel. Any such off gas not returned in that way may be directed to a compressor and one or more heat exchangers for return to, for example, the suction of the primary compressor. In an especially preferred embodiment, all of the off gas from the second separation vessel is returned to the product mixture downstream of the high pressure let down valve and upstream of the first separation vessel. In one embodiment, all of the gas drawn into the pumps means is from the second separation vessel. In an alternative embodiment, the gas drawn into the pump means additionally includes ethylene gas drawn from another location. For example, gas may also be drawn into the jet pump from the outlet of the ethylene recycle system. That cool ethylene will provide additional cooling of the product stream.

The ratio of the flow rates in tonnes/hour of the product mixture entering the pump means from the high pressure let down valve and the off gas entering the pump means from the second or subsequent separation vessel is optionally in the range of from 100:1 to 2:1, preferably from 50:1 to 4:1, more preferably from 20:1 to 5:1.

The third separation vessel operates at a pressure which is lower than that of the second separation vessel and is preferably no more than 20 barg, more preferably no more than 5 barg, yet more preferably no more than 2 barg and especially preferably no more than 0.9 barg. The third separation vessel optionally operates at a pressure of at least 0 barg, preferably 0.1 barg. The third pressure vessel optionally operates at a pressure in the range of from 0.1 to 20 barg, more preferably from 0.1 to 5 barg, yet more preferably from 0.1 to 2 barg and especially preferably from 0.1 to 0.9 barg (barg=bar gauge, that is, pressure in excess of atmospheric). The pressure in the third separation vessel may be governed by the suction pressure control of the purge compressor. Advantageously, the product mixture leaving the third separator is essentially molten polymer containing less than 1 wt %, preferably less than 0.2 wt %, more preferably less than 0.1 wt % and especially preferably less than 0.08 wt % of residual monomer. Advantageously, that molten polymer is, without any further ethylene removal stages, formed into pellets. Advantageously, the pellets comprise less than 0.1 wt % ethylene.

As mentioned above, the return of off gas from the second or subsequent separation vessel back to the product stream upstream of the first separation vessel generally increases the proportion of the total unreacted monomer which is removed as off gas from that first vessel, as compared to a system in which no such return of off gas takes place. Preferably, at least 70%, more preferably at least 80% and especially preferably at least 85% or even at least 90% by weight of the total unreacted monomer is removed as off gas from the first separation vessel. Optionally, no more than 97% by weight of the total unreacted monomer is removed as off gas from the first separation vessel.

In the preferred embodiment having only three separation vessels, the molten polymer leaves the third separation vessel and preferably flows into the intake of an extruder in which the polymer is typically combined with an additives package, extruded, cooled and chopped into pellets. The pellets may then be bagged or sent to storage silos or other product handling facilities.

The off gas from the third separation vessel may be directed to a compressor, commonly referred to as the purge compressor. That purge compressor preferably compresses that off gas, optionally along with other low pressure ethylene such as leakage gas coming from the compressors, up to the pressure at the suction of the secondary compressor. The purge compressor may be one or more cylinders of the primary compressor.

The various components of the apparatus will be connected by conduits for the flow of material between them. The conduits may include such auxiliary equipment such as valves, heat exchangers and sensors as may be desired.

The invention also provides in a further aspect an apparatus for the high pressure polymerization of olefins comprising
 a high pressure reactor in which monomer is polymerised to give a product mixture comprising polymer and unreacted monomer;
  a high pressure let down valve downstream of the reactor through which the product mixture comprising polymer and unreacted monomer from the high pressure reactor flows;
  a jet pump located downstream of the high pressure let down valve and through which the product flows; and
  a separation system located downstream of the jet pump comprising a first separation vessel having an inlet for the product mixture, an outlet for off gas and an outlet for a liquid phase;
  a second separation vessel downstream of the first separation vessel having an inlet for receiving the liquid phase from the first separation vessel, an outlet for off gas and an outlet for a liquid phase;
  a third separation vessel downstream of the second separation vessel having an inlet for receiving the liquid phase from the second separation vessel, an outlet for off gas and an outlet for a liquid phase; and
  a conduit for returning the off gas from the second separation vessel to the jet pump for combination with the product mixture upstream of the first pressure vessel. The liquid phase leaving each separation vessel will comprise principally polymer and monomer, and the concentration of polymer will increase from vessel to vessel.

In a yet further aspect the invention provides a process for producing polyethylene and polyethylene copolymers comprising
 polymerizing ethylene, optionally in the presence of one or more comonomers, in a high pressure reactor to produce a product mixture comprising polymer and unreacted monomer,
 passing the product mixture through a high pressure let down valve;
 separating unreacted monomer from the product mixture in a separation system located downstream of the high pressure let down valve, the separation system comprising at least first, second and third separation vessels arranged in series, in which the monomer gas is separated from the product mixture as off gas and wherein at least some of the off gas from at least one of the separation vessels downstream of the first separation vessel is combined back into the product mixture at a location downstream of the high pressure let down valve and upstream of the first separation vessel.

BRIEF DESCRIPTION OF THE DRAWINGS

The invention will now be described for the purpose of illustration only with reference to the Figures in which.

DETAILED DESCRIPTION OF THE INVENTION

Figure 1:
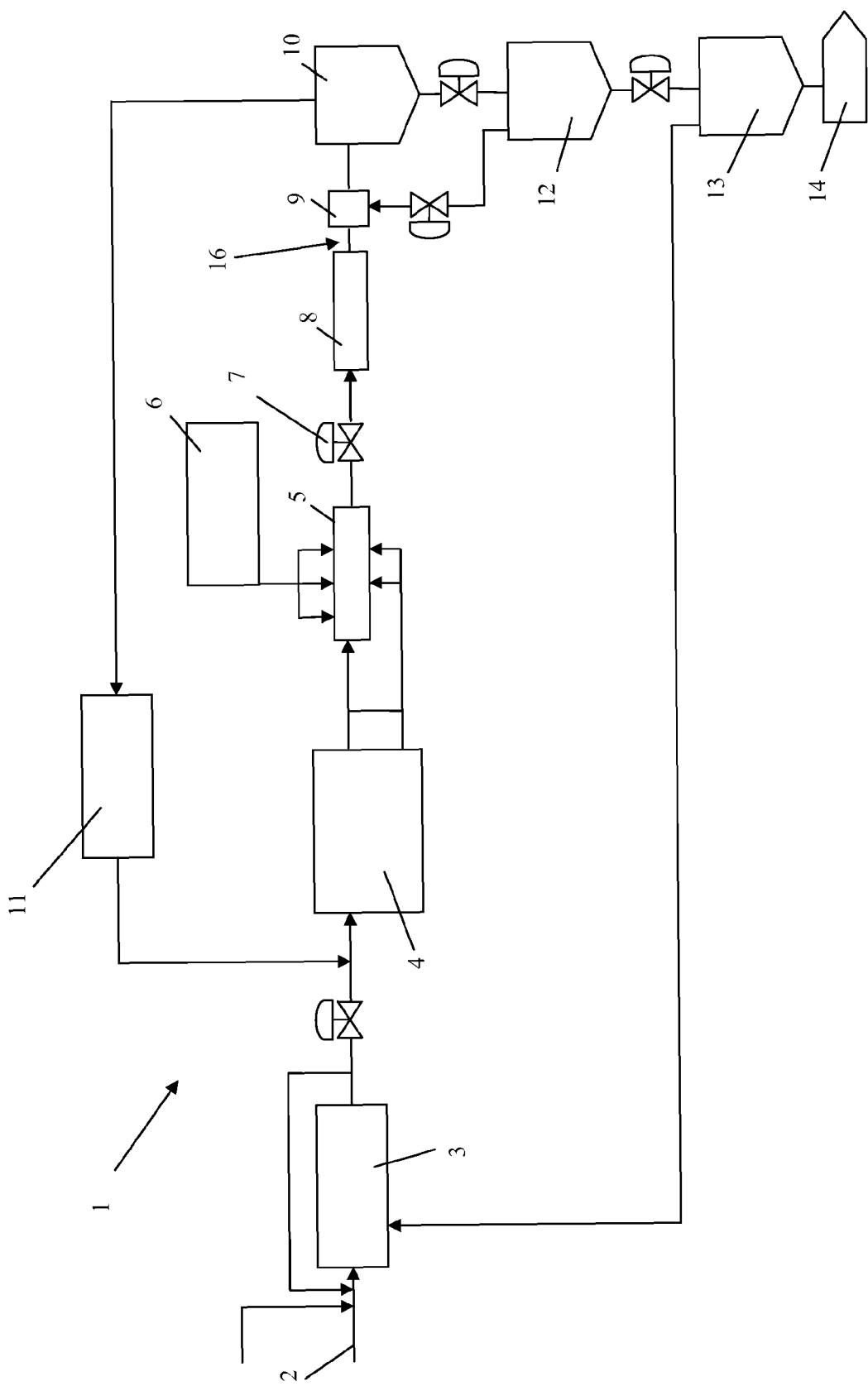
FIG. 1 is a schematic diagram of an apparatus according to the invention comprising a tubular reactor.

FIG. 1 shows a polymerization plant 1 including an ethylene feed line 2 which supplies ethylene at a pressure of 70 bar to a primary compressor 3 which compresses the ethylene to a pressure of approximately 300 bar. The outlet of the primary compressor 3 communicates through a conduit having a valve with the inlet of secondary compressor 4 which is a two-stage reciprocating compressor. That secondary compressor 4 compresses the ethylene and other reaction components to a pressure of 3000 bar. The compressed ethylene leaving the secondary compressor 4 is split into two streams, one of which enters the front end of a tubular reactor 5 and the other being split into one or more sidestreams which enter the tubular reactor 5 at points along its length. The tube reactor is also provided along its length with several initiator injection points which are fed from the initiator injection system 6.

From the tubular reactor 5 the mixture of polymer and unreacted monomer passes through high pressure let down valve 7 into a product cooler 8 which comprises a tube of larger diameter than the tube of the tubular reactor 5 equipped with a cooling jacket to cool the product mixture. The pressure in the product cooler 8 is much lower than the pressure in the tubular reactor which causes the product mixture to phase separate into a two phase mixture having polymer rich and polymer poor phases. That mixture passes from the product cooler 8, through jet pump 9 (shown in more detail in FIG. 3) and into first separation vessel 10. As depicted in FIG. 1, that separation vessel has an upper, generally cylindrical portion and a lower, inverted conical portion. The product mixture enters the first separation vessel through an inlet set into the cylindrical wall of the upper part of the reactor and, once inside the first separation vessel 10, rapidly separates into a stream of unreacted monomer gas and a polymer rich liquid phase which collects in the lower part of the separation vessel 10. The monomer gas leaves the first separation vessel 10 as off gas via an outlet set in the upper surface of that vessel and passes via a conduit to a recycle system 11. That recycle system 11 includes waste heat boilers and heat exchangers for cooling the monomer gas and knock out pots for dewaxing. The monomer gas leaves the recycle system 11 and flows back to the inlet of the secondary compressor 4. The first pressure vessel 10 operates at a pressure equal to or slightly higher than the 300 bar pressure at the inlet of the secondary compressor, and so there is no need to compress the off gas from that vessel before it reaches secondary compressor 4.

The concentrated polymer/monomer mixture leaves the first separation vessel 10 via an outlet set in the bottom of the conical portion of that vessel and passes through a valved conduit into the upper part of the second separation vessel 12. That second separation vessel 12 is similar in shape to the first separation vessel and operates at a pressure in the region of from 70 to 120 bar. In the second separation vessel 12 the concentrated polymer/monomer mixture separates into off gas and a yet more concentrated polymer/monomer mixture. The off gas flows from an outlet in the upper part of the second separation vessel 12 via a conduit to the jet pump 9, where it is injected into and combines with the product mixture flowing through the jet pump 9 from the product cooler 8. The flow rate in tonnes/hour of off gas from the second separator vessel 12 is approximately one tenth the flow rate of the off gas leaving the first separation vessel 10.

The yet more concentrated polymer/monomer mixture leaves the second separation vessel 12 via an outlet set in the bottom of that vessel and passes via a valved conduit into the upper part of the third separation vessel 13 which is of generally similar shape to the first and second separation vessels. The third separation vessel operates at between 0.5 and 1.0 barg and almost all of the remaining monomer is separated off as off gas which leaves that vessel via an outlet set in the upper portion of the vessel. The off gas flow rate in tonnes/hour from the third separation vessel 12 is approximately half the flow rate of off gas from the second separation vessel 12. The off gas from the third separation vessel 13 passes via a conduit equipped with heat exchangers (not shown in FIG. 1) to the primary compressor 3, four cylinders of which are dedicated to acting as purge compressor. Following compression to 300 bar, the off gas, in combination with purge gas from other parts of the installation, is combined in the primary compressor with the fresh ethylene from source 2.

The molten polymer leaves the third separation vessel 13 via an outlet in the bottom of that vessel and passes through a short conduit into the intake of an extruder 14 which extrudes the polymer into strings which are chopped, cooled and transferred to product storage bins (not shown in FIG. 1). The polymer product comprises less than 1% by weight of residual monomer.

Figure 2:
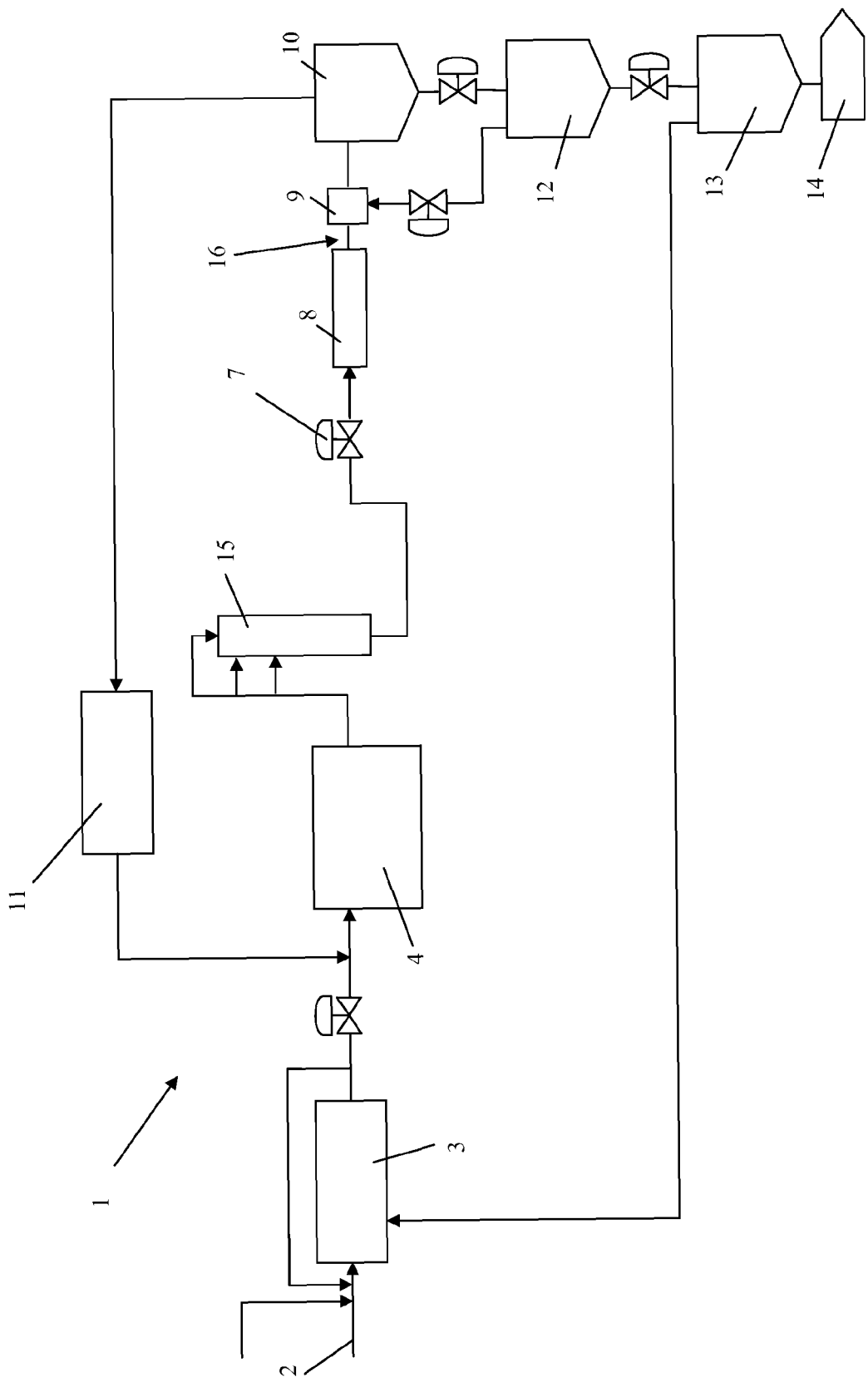
FIG. 2 shows an apparatus according to the invention which comprises an autoclave reactor.

FIG. 2 depicts an apparatus which is generally similar to that of FIG. 1, and the same reference numbers are used to refer to the same components, where appropriate. However, instead of a tubular reactor the apparatus of FIG. 2 includes an autoclave reactor 15. Such reactors are well known in the art for the high pressure polymerization of olefins. Thus, the highly compressed ethylene leaving the secondary compressor 4 is split into three streams, one of which enters at the top of autoclave reactor 15 and the other two enter along side of that reactor. The product mixture flows out from the bottom of the autoclave 15 through the high pressure let down valve 7 and into product cooler 8 and then through the separation system, in the manner described above in respect of the apparatus of FIG. 1.

Figure 3:
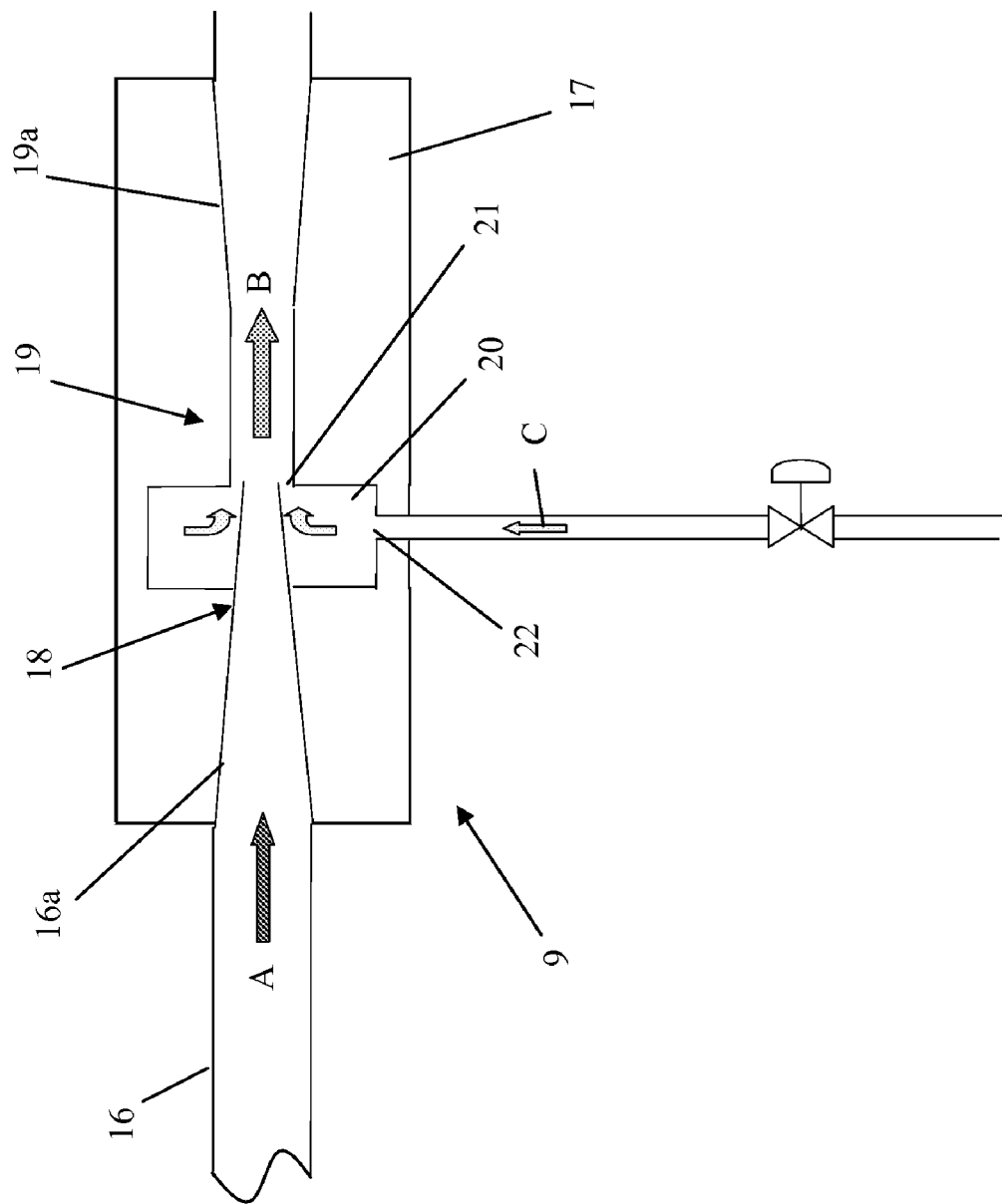
FIG. 3 depicts a jet pump as used in the apparatus of FIG. 1 and FIG. 2.

The jet pump 9 is shown in greater detail in FIG. 3. The product mixture flows through the high pressure let down valve 7 and product cooler 8 (not shown in FIG. 3) along conduit 16 in the direction of arrow A into the jet pump 9. The jet pump 9 is constructed of high strength steel and comprises a generally cylindrical outer body 17 into one end of which the conduit 16 enters. Once inside the body 17 the conduit 16 tapers in a tapered portion 16*a* down to form nozzle 18. The flow velocity of the product mixture increases in the tapered portion of conduit 16 and it leaves the nozzle 18 as a high velocity jet (see arrow B) which projects into a conduit 19 which is coaxial with the nozzle 18 but of slightly larger diameter. After a short distance, the conduit 19 begins to taper outwards in a tapered portion 19*a* (referred to as a "diffuser") until it is at a diameter similar to that of conduit 16.

The product mixture then leaves the jet pump and flows via a conduit to the first separation vessel 10 (not shown in FIG. 3).

As can be seen from FIG. 3, surrounding the nozzle 18 is a short cylindrical chamber 20, which is coaxial with nozzle 18 and opens into conduit 19. Nozzle 18 extends through that chamber 20 and terminates just at the entrance of conduit 19, thereby defining a narrow annular gap 21 between the rim of the nozzle 18 and the conduit 19.

The off gas from the second separation chamber 12 flows along a conduit in the direction of arrow C and through an inlet 22 into the chamber 20. The jet of product mixture emerging from nozzle 18 is at a velocity sufficient that its pressure is lower than that of the off gas in chamber 20. That off gas accordingly flows through the annular gap 21 and combines with the product mixture in diffuser 19*a*.

Although preferred embodiments have been depicted and described in detail herein, it will be apparent to those skilled in the relevant art that various modifications, additions, substitutions, and the like can be made without departing from the spirit of the invention and these are, therefore, considered to be within the scope of the invention as defined in the claims which follow. To the extent that our description is specific, this is solely for the purpose of illustrating preferred embodiments of our invention and should not be taken as limiting our invention to these specific embodiments. The use of subheadings in the description is intended to assist and is not intended to limit the scope of our invention in any way.

The invention claimed is:

1. An apparatus for the high pressure polymerization of ethylene, optionally with one or more comonomers, comprising a high pressure reactor in which monomer is polymerised to produce a product mixture comprising polymer and unreacted monomer, a high pressure let down valve downstream of the reactor through which the product mixture from the high pressure reactor flows;

pump means downstream of said high pressure let down valve; and a separation system downstream of the pump means, the separation system comprising at least first, second and third separation vessels arranged in series for the separation of gas from the product mixture as off gas and a conduit for off gas running from said second separator directly into said pump means and back into the product mixture.

2. The apparatus of claim 1 in which the pump means utilises the energy of the flow of product mixture from the high pressure let down valve.

3. The apparatus of claim 1 or claim 2 in which the pump means is a jet pump.

4. The apparatus of claim 1 which comprises a product cooler downstream of the high pressure let down valve and upstream of the first separation chamber.

5. The apparatus of claim 1 in which the separation system comprises only three separation vessels.

6. The apparatus of claim 1 which comprises an extruder located immediately downstream of the final separation vessel.

7. The apparatus of claim 1 which comprises a primary compressor for compressing fresh ethylene to an intermediate pressure and a secondary compressor for compressing the monomer to the pressure of the reactor and a recycle system including heat exchangers for cooling the off gas from the first separation vessel and returning it to the suction of that secondary compressor.

8. The apparatus of claim 1 in which the high pressure reactor is a tubular reactor.

9. The apparatus of claim 1 in which the high pressure reactor is an autoclave.

10. An apparatus for the high pressure polymerization of olefins comprising
a high pressure reactor in which monomer is polymerised to give a product mixture comprising polymer and unreacted monomer;
a high pressure let down valve downstream of the reactor through which the product mixture comprising polymer and unreacted monomer from the high pressure reactor flows;
a jet pump located downstream of the high pressure let down valve and through which the product flows; and
a separation system located downstream of the jet pump comprising a first separation vessel having an inlet for the product mixture, an outlet for off gas and an outlet for a liquid phase;
a second separation vessel downstream of the first separation vessel having an inlet for receiving the liquid phase from the first separation vessel, an outlet for off gas and an outlet for a liquid phase;
a third separation vessel downstream of the second separation vessel having an inlet for receiving the liquid phase from the second separation vessel, an outlet for off gas and an outlet for a liquid phase; and
a conduit for returning the off gas from the second separation vessel directly to the jet pump for combination with the product mixture upstream of the first pressure vessel and downstream of the high pressure let down valve.

11. A process for producing polyethylene and ethylene copolymers comprising:
polymerizing ethylene, optionally in the presence of one or more comonomers, in a high pressure reactor to produce a product mixture comprising polymer and unreacted monomer,
passing the product mixture through a high pressure let down valve;
separating unreacted monomer from the product mixture in a separation system located downstream of the high pressure let down valve, the separation system comprising at least first, second and third separation vessels arranged in series, in which the monomer gas is separated from the product mixture as off gas and wherein at least some of the off gas from at least one of the separation vessels downstream of the first separation vessel is combined directly back into the product mixture at a location downstream of the high pressure let down valve and upstream of the first separation vessel.

12. The process of claim 11 in which energy associated with the flow of the product mixture downstream of the high pressure let down valve and upstream of the first separation chamber is used to combine the off gas back into the product mixture.

13. The process of claim 11 or claim 12 in which the off gas is combined back into the product mixture using a jet pump which is located downstream of the high pressure let down valve and upstream of the first separation chamber.

14. The process of claim 11 in which the first separation vessel operates at a pressure in the range of from 200 to 500 bar.

15. The process of claim 11 in which the second separation vessel operates at a pressure in the range of from 10 to 250 bar.

16. The process of claim 11 in which the third separation vessel operates at a pressure in the range of from 0.1 to 20 barg.

17. The process of claim 11 in which the product mixture leaving the third separation vessel comprises no more than 0.8% by weight of unreacted monomer.

18. The process of claim 11 in which ethylene is the only monomer present and the polymer is an ethylene homopolymer.

19. The process of claim 11 in which one or more comonomers are present and the polymer is an ethylene copolymer.

* * * * *